United States Patent [19]

Federico et al.

[11] Patent Number: 5,023,779

[45] Date of Patent: Jun. 11, 1991

[54] DISTRIBUTED PROCESSING ENVIRONMENT FAULT ISOLATION

[75] Inventors: Anthony M. Federico, West Webster; Ronald A. Ippolito, Rochester, both of N.Y.

[73] Assignee: Xerox Corporation, Stamford, Conn.

[21] Appl. No.: 420,991

[22] Filed: Sep. 21, 1982

[51] Int. Cl.⁵ .............................................. G06F 11/00
[52] U.S. Cl. ................................. 364/200; 364/230.4; 364/230; 364/265.1; 364/265; 364/265.4; 371/16.7; 371/29.1
[58] Field of Search ...................... 371/36, 68, 67, 7, 8, 371/9, 72, 10, 3, 4, 11, 16, 20, 22, 24, 25, 34, 71; 364/551, 569, 200 MS File, 900 MS File

[56] References Cited

U.S. PATENT DOCUMENTS

| | | | |
|---|---|---|---|
| 3,614,742 | 10/1971 | Watson et al. | 364/200 |
| 3,699,529 | 10/1972 | Beyers et al. | 364/200 |
| 3,760,365 | 9/1973 | Kurtzberg et al. | 364/200 |
| 3,787,816 | 1/1974 | Hauck et al. | 364/200 |
| 3,805,247 | 4/1974 | Zucker et al. | 364/200 |
| 3,812,469 | 5/1974 | Hauck et al. | 364/200 |
| 3,813,647 | 5/1974 | Loo | 364/900 |
| 3,896,290 | 7/1975 | Denaval | 364/408 |
| 3,916,383 | 10/1975 | Malcolm | 364/200 |
| 3,978,452 | 8/1976 | Barton et al. | 364/200 |
| 3,983,539 | 9/1976 | Faber et al. | 364/200 |
| 3,983,541 | 9/1976 | Faber et al. | 364/200 |
| 4,044,334 | 8/1977 | Bachman et al. | 364/200 |
| 4,064,375 | 12/1977 | Schubeler et al. | 364/107 |
| 4,084,228 | 4/1978 | Dufond et al. | 364/200 |
| 4,099,252 | 7/1978 | Danco | 364/900 |
| 4,123,794 | 10/1978 | Matsumoto | 364/101 |
| 4,138,718 | 2/1979 | Toke et al. | 364/200 |
| 4,170,791 | 10/1979 | Daughton et al. | 364/900 |
| 4,186,299 | 1/1980 | Batchelor | 235/304.1 |
| 4,215,395 | 7/1980 | Bunyard et al. | 364/101 |
| 4,219,873 | 8/1980 | Kober et al. | 364/200 |
| 4,224,664 | 9/1980 | Trinchieri | 364/200 |
| 4,228,495 | 10/1980 | Bernhard et al. | 364/101 |
| 4,229,790 | 10/1980 | Gilliland et al. | 364/200 |
| 4,253,145 | 2/1981 | Goldberg | 364/200 |
| 4,270,168 | 5/1981 | Murphy et al. | 364/200 |
| 4,283,769 | 8/1981 | Asada | 364/710 |
| 4,304,001 | 12/1981 | Cope | 371/8 |
| 4,322,846 | 3/1982 | Carroll et al. | 371/16 |
| 4,327,993 | 5/1982 | Gauronski et al. | 355/14 SH |
| 4,410,983 | 10/1983 | Cope | 371/8 |
| 4,412,281 | 10/1983 | Works | 364/200 |
| 4,413,335 | 11/1983 | Clements et al. | 370/16 |
| 4,442,502 | 4/1984 | Friend et al. | 364/900 |
| 4,454,588 | 6/1984 | O'Brien | 364/551 |
| 4,468,731 | 8/1984 | Johnson et al. | 364/200 |
| 4,503,534 | 3/1985 | Budde et al. | 371/9 |

FOREIGN PATENT DOCUMENTS 55-87256 7/1980 Japan .................................. 371/7

OTHER PUBLICATIONS

Toy, W. N., "Fault Tolerant Design of Local ESS Processors", Proceedings of the IEEE, vol. 66, No. 10, Oct. 1978.
Katsuki et al., "Pluribus—An Operational Fault-Tolerant Multiprocessor", Proceedings of the IEEE, vol. 66, No. 10, Oct., 1978.

Primary Examiner—Gareth D. Shaw
Assistant Examiner—Kevin A. Kriess
Attorney, Agent, or Firm—Ronald F. Chapuran

[57] ABSTRACT

The present invention is to designate one of the processors in a multiprocessor control as the master processor. All the other processors report their faults to the master processor. When it receives a fault message, the master processor records the type of fault and the source of the message in suitable memory locations. The master will also time stamp the fault message to identify the first fault message. Finally, the master will transmit a message to itself to verify that the master's communication channel is valid to verify whether the master processor itself or one of the remote processors is faulty.

3 Claims, 9 Drawing Sheets

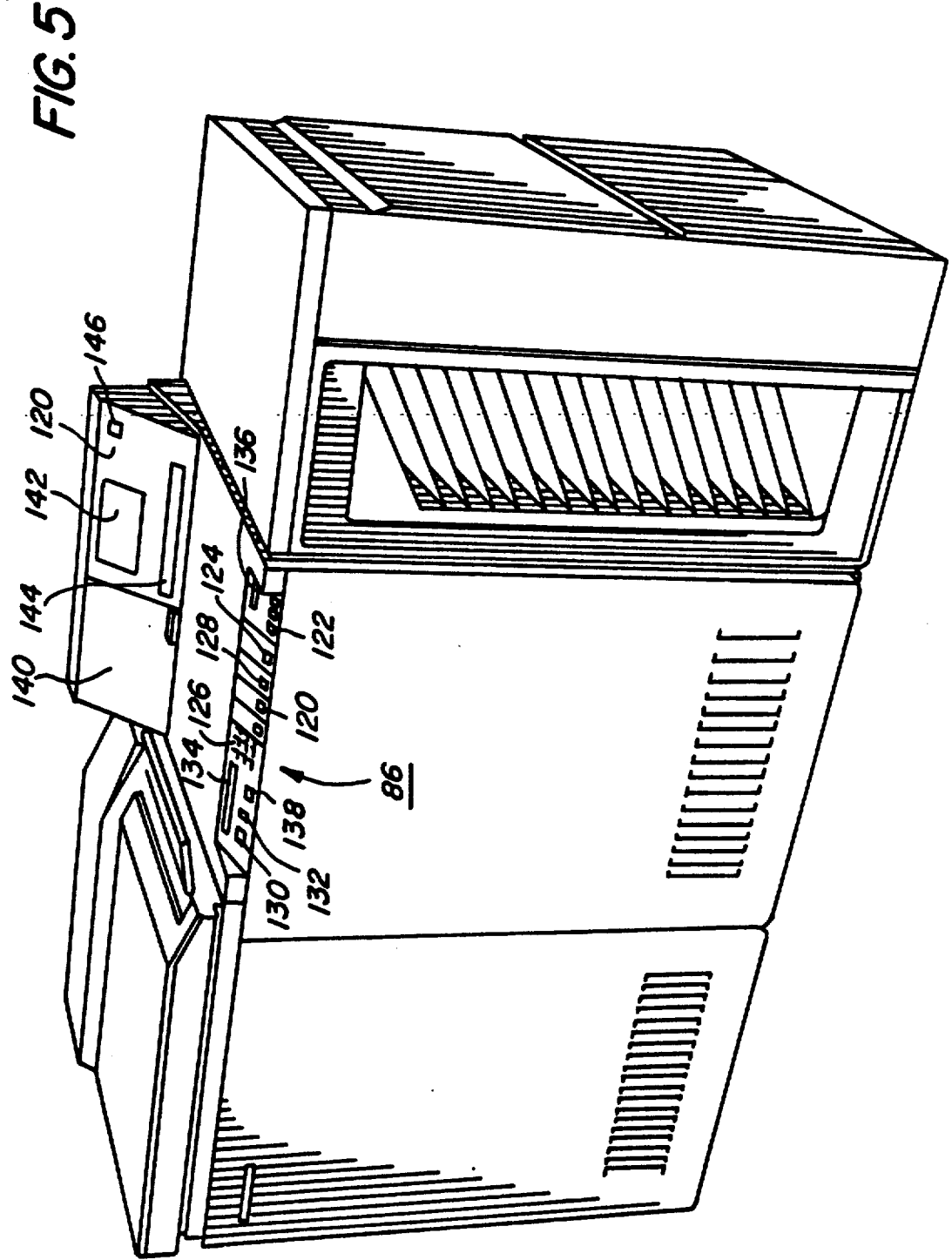

DISTRIBUTED PROCESSING ENVIRONMENT FAULT ISOLATION

This invention relates to a multiprocessor machine control, in particular, to fault isolation in a distributed processing environment.

For further information relating to this application, reference is made to the following companion U.S. patent applications filed concurrently herewith to the common assignee U.S. Ser. No. 420,965, Remote Process Crash Recovery; U.S. Ser. No. 420,988, Process Scheduler in an Electronic Control; U.S. Ser. No. 420,992, Common Control in Multiple Processors By Chaining Tasks; U.S. Ser. No. 420,993, Virtual Machine Control; U.S. Ser. No. 420,994, Task Control Manager; U.S. Ser. No. 420,995, Control System Job Recovery After a Malfunction; U.S. Ser. No. 420,999, Separate Resetting of Processors in a Multiprocessor Control; U.S. Ser. No. 421,006, Filtered Inputs; U.S. Ser. No. 421,007, Multiprocessor Control Synchronization and Instruction Downloading; U.S. Ser. No. 421,008, Multiprocessor Memory Map; U.S. Ser. No. 421,009, Changing Portions of Control in a ROM Based System; U.S. Ser. No. 421,010, Race Control Suspension; U.S. Ser. No. 421,011, Control Fault Detection for Machine Recovery and Diagnostics Prior to Malfunction; U.S. Ser. No. 421,016, Single Point Microprocessor Reset; and U.S. Ser. No. 421,615, Control Crash Diagnostics.

In reproduction machine controls employing multiprocessor control systems, there will often be problems as a result of interaction of two or more of the intelligent processors. In general, techniques used to monitor and diagnose single processor control systems will be inadequate in isolating the root cause of problems in the more sophisticated multiprocessor control systems.

It would be desirable, therefore, to provide a diagnostic and monitoring technique in a multiprocessor control system that is able to isolate and identify the cause of the system problems.

It is, therefore, an object of the present invention to provide a new and improved fault isolation system in a multiprocessor control system. A further object of the present invention is to provide a diagnostic system that not only recognizes a problem but also identifies its source.

Further advantages of the present invention will become apparent as the following description proceeds, and the features characterizing the invention will be pointed out with particularity in the claims annexed to and forming a part of this specification.

Briefly, the present invention is to designate one of the processors in a multiprocessor control as the master processor. All the other processors report their faults to the master processor. All processors periodically send a message to the master as a "watchdog function". This combined with the master's periodic sending of messages to the other processors insures system integrity. When it receives a fault message, the master processor records the type of fault and the source of the message in suitable memory locations. The master will also time stamp the fault message to identify the first fault message. Finally, if the master processor finds that it cannot communicate with another processor, the master will transmit a message to itself to verify that the master's communication channel is valid to verify whether the master processor itself or one of the remote processors is faulty.

For a better understanding of the present invention, reference may be had to the accompanying drawings wherein the same reference numerals have been applied to like parts and wherein:

FIG. 5 is an isometric view of the machine configuration of FIG. 1 showing the control panel and the display control remote panel;

Figure 1:
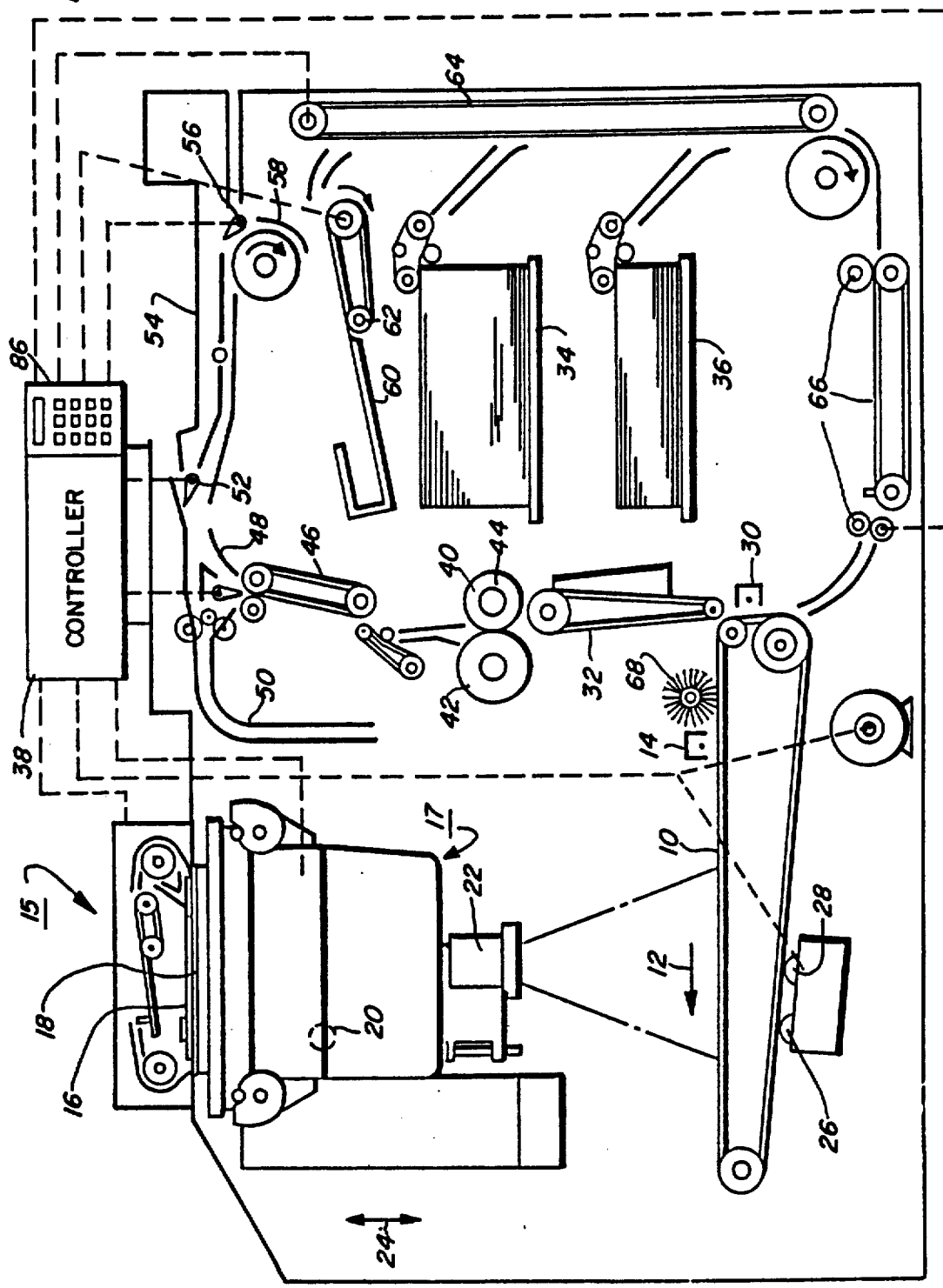
FIG. 1 is an elevational view of a reproduction machine typical of the type of machine or process that can be controlled in accordance with the present invention.

With reference to FIG. 1, there is shown an electrophotographic printing or reproduction machine employing a belt 10 having a photoconductive surface. Belt 10 moves in the direction of arrow 12 to advance successive portions of the photoconductive surface through various processing stations, starting with a charging station including a corona generating device 14. The corona generating device charges the photoconductive surface to a relatively high substantially uniform potential.

The charged portion of the photoconductive surface is then advanced through an imaging station. At the imaging station, a document handling unit 15 positions an original document 16 facedown over exposure system 17. The exposure system 17 includes lamp 20 illuminating the document 16 positioned on transparent platen 18. The light rays reflected from document 16 are transmitted through lens 22. Lens 22 focuses the light image of original document 16 onto the charged portion of the photoconductive surface of belt 10 to selectively dissipate the charge. This records an electrostatic latent image on the photoconductive surface corresponding to the informational areas contained within the original document.

Platen 18 is mounted movably and arranged to move in the direction of arrows 24 to adjust the magnification of the original document being reproduced. Lens 22 moves in synchronism therewith so as to focus the light image of original document 16 onto the charged portion of the photoconductive surface of belt 10.

Document handling unit 15 sequentially feeds documents from a holding tray, in seriatim, to platen 18. The document handling unit recirculates documents back to the stack supported on the tray. Thereafter, belt 10 advances the electrostatic latent image recorded on the photoconductive surface to a development station.

At the development station a pair of magnetic brush developer rollers 26 and 28 advance a developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to the transfer station. At the transfer station a copy sheet is moved into contact with the toner powder image. The transfer station includes a corona generating device 30 which sprays ions onto the backside of the copy sheet. This attracts the toner powder image from the photoconductive surface of belt 10 to the sheet.

The copy sheets are fed from a selected one of trays 34 or 36 to the transfer station. After transfer, conveyor 32 advances the sheet to a fusing station. The fusing station includes a fuser assembly for permanently affixing the transferred powder image to the copy sheet. Preferably, fuser assembly 40 includes a heated fuser roller 42 and backup roller 44 with the sheet passing between fuser roller 42 and backup roller 44 with the powder image contacting fuser roller 42.

After fusing, conveyor 46 transports the sheets to gate 48 which functions as an inverter selector. Depending upon the position of gate 48, the copy sheets will either be deflected into a sheet inverter 50 or bypass sheet inverter 50 and be fed directly onto a second gate 52. Decision gate 52 deflects the sheet directly into an output tray 54 or deflects the sheet into a transport path which carries them on without inversion to a third gate 56. Gate 56 either passes the sheets directly on without inversion into the output path of the copier, or deflects the sheets into a duplex inverter roll transport 58. Inverting transport 58 inverts and stacks the sheets to be duplexed in a duplex tray 60. Duplex tray 60 provides intermediate or buffer storage for those sheets which have been printed on one side for printing on the opposite side.

In order to complete duplex copying, the previously simplexed sheets in tray 60 are fed seriatim by bottom feeder 62 back to the transfer station for transfer of the toner powder image to the opposed side of the sheet. Conveyors 64 and 66 advance the sheet along a path which produces a sheet inversion. The duplex sheets are then fed through the same path as the previously simplexed sheets to be stacked in tray 54 for subsequent removal by the printing machine operator.

Invariably after the copy sheet is separated from the photoconductive surface of belt 10, some residual particles remain adhering to belt 10. These residual particles are removed from the photoconductive surface thereof at a cleaning station. The cleaning station includes a rotatably mounted brush 68 in contact with the photoconductive surface of belt 10.

A controller 38 and control panel 86 are also illustrated in FIG. 1. The controller 38 as represented by dotted lines is electrically connected to various components of the printing machine.

Figure 2:
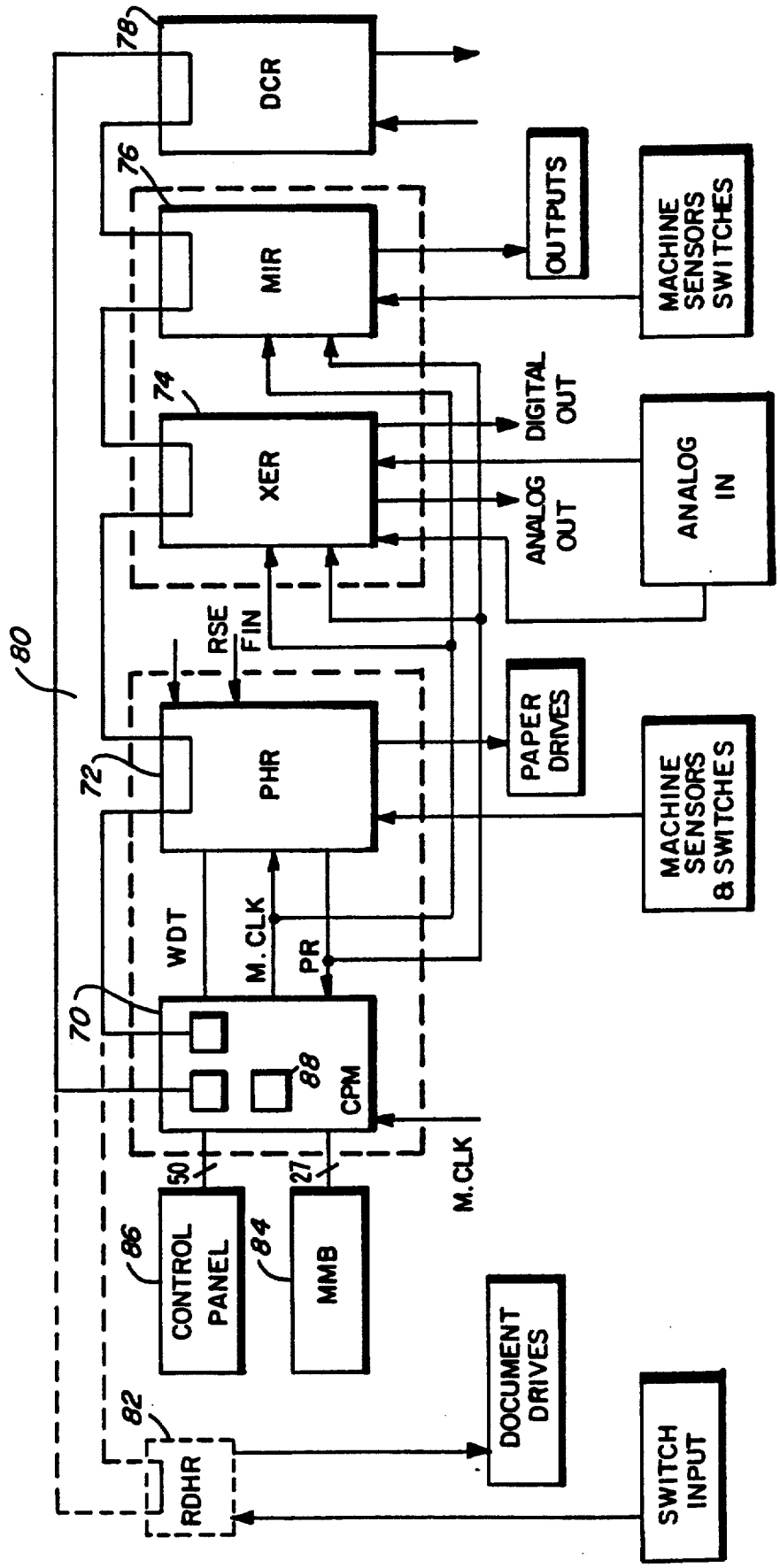
FIG. 2 is a block diagram of the control boards for controlling the machine of FIG. 1.

With reference to FIG. 2, there is shown in further detail the controller 38 illustrated in FIG. 1. In particular, there is shown a Central Processing Master (CPM) control board 70 for communicating information to and from all the other control boards, in particular the Paper Handling Remote (PHR) control board 72 controlling the operation of the paper handling subsystems such as paper feed, registration and output transports.

Other control boards are the Xerographic Remote (XER) control board 74 for monitoring and controlling the xerographic process, in particular the analog signals, the Marking and Imaging Remote (MIR) control board 76 for controlling the operation of the optics and xerographic subsystems, in particular the digital signals. A Display Control Remote (DCR) control board 78 is also connected to the CPM control board 70 providing operation and diagnostic information on both an alphanumeric and liquid crystal display. Interconnecting the control boards is a shared communication line 80, preferably a shielded coaxial cable or twisted pair with suitable communication protocol similar to that used in a Xerox Ethernet ® type communication system. For a more detailed explanation of an Ethernet ® type Communication System, reference is made to pending applications; U.S. Ser. Nos. 205,809; 205,822 and 205,821, all filed Nov. 10, 1980 and incorporated herein as references.

Other control boards can be interconnected to the shared communication line 80 as required. For example, a Recirculating Document Handling Remote (RDHR) control board 82 (Shown in phantom) can be provided to control the operation of a recirculating document handler. There can also be provided a not shown Semi-Automatic Document Handler Remote (SADHR) control board to control the operation of a semi-automatic document handler, one or more not shown Sorter Output Remote (SOR) control boards to control the operation of one or more sorters, and a not shown Finisher Output Remote (FOR) control board to control the operation of a stacker and stitcher.

Each of the controller boards preferably includes an Intel 8085 microprocessor with suitable Random Access Memory (RAM) and Read Only Memory (ROM). Also interconnected to the CPM control board is a Master Memory Board (MMB) 84 with suitable ROMs to control normal machine operation and a control panel board 86 for entering job selections and diagnostic programs. Also contained in the CPM board 70 is suitable nonvolatile memory. All of the control boards other than the CPM control board are generally referred to as remote control boards.

In a preferred embodiment, the control panel board 86 is directly connected to the CPM control board 70 over a 70 line wire and the memory board 84 is connected to the CPM control board 70 over a 36 line wire. Preferably, the Master Memory Board 84 contains 56K byte memory and the CPM control board 70 includes 2K ROM, 6K RAM, and a 512 byte nonvolatile memory. The PHR control board 72 includes 1K RAM and 4K ROM and handles 29 inputs and 28 outputs. The XER control board 74 handles up to 24 analog inputs and provides 12 analog output signals and 8 digital output signals and includes 4K ROM and 1K RAM. The MIR board 76 handles 13 inputs and 17 outputs and has 4K ROM and 1K RAM.

As illustrated, the PHR, XER and MIR boards receive various switch and sensor information from the printing machine and provide various drive and activation signals, such as to clutches, motors and lamps in the operation of the printing machine. It should be understood that the control of various types of machines and processes are contemplated within the scope of this invention.

Figure 3:
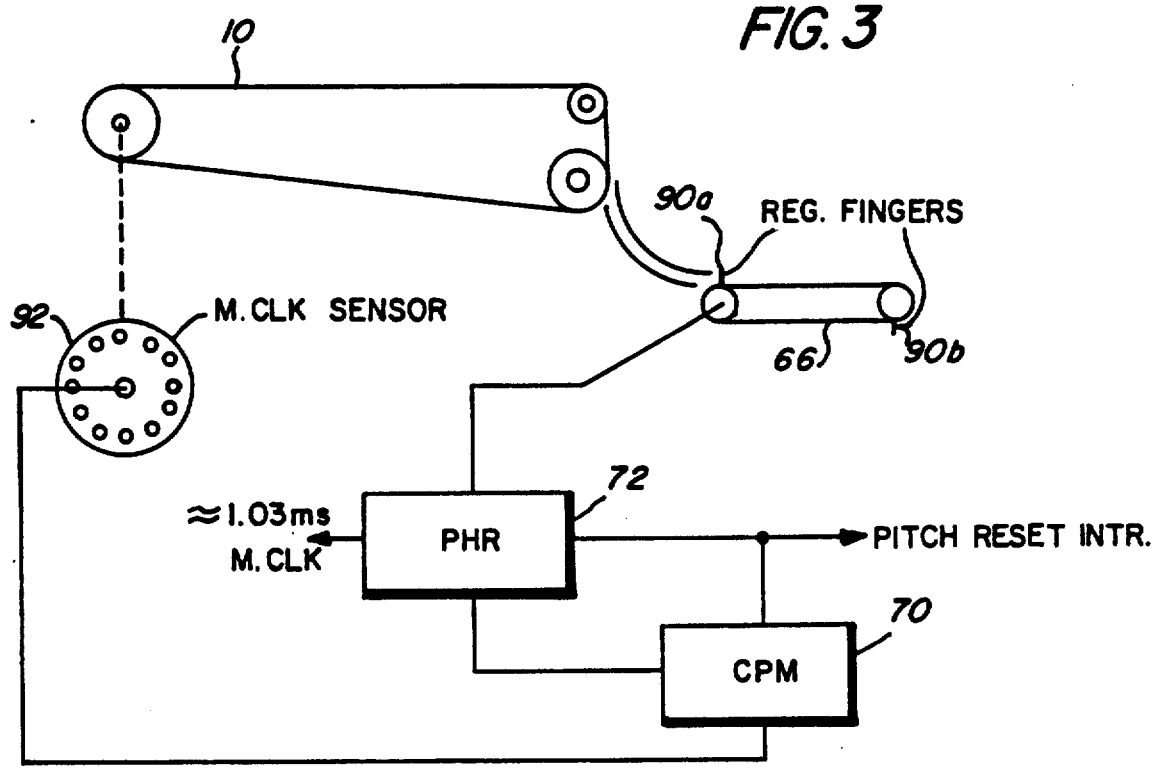
FIG. 3 illustrates some of the basic timing signals used in control of the machine illustrated in FIG. 1.

A master timing signal, called the timing reset or Pitch Reset (PR) signal, as shown in FIG. 2, is generated by PHR board 72 and used by the CPM, PHR, MIR and XER control boards 70, 72, 74 and 76. With reference to FIG. 3, the Pitch Reset (PR) signal is generated in response to a sensed registration finger. Two registration fingers 90a, 90b on conveyor or registration transport 66 activate a not shown suitable sensor to produce the registration finger or pitch reset signal. The registration finger or pitch reset signal is conveyed to suitable control logic on the Paper Handler Remote control board 72. In addition, a Machine Clock signal (MCLK) is conveyed to the Paper Handling Remote 72 via the CPM remote board 70 to the same control logic.

In response to the MCLK signal, the timing reset pitch reset signal is conveyed to the CPM board 70 and the XER and the MIR remotes 74, 76. The machine clock signal is generated by a timing disk 92 or machine clock sensor connected to the main drive of the machine. The clock sensor signal allows the remote control boards to receive actual machine speed timing information.

The timing disk 92 rotation generates 1,000 machine clock pulses every second. A registration finger sensed signal occurs once for every registration finger sensed signal as shown in FIG. 3. A belt hole pulse is also provided to synchronize the seam on the photoreceptor belt 10 with the transfer station to assure that images are not projected onto the seam of the photoreceptor belt.

In any complex control system, there is always a large number of machine problems, either software or hardware, that can cause the control system to temporarily malfunction. The name typically given to this class of problems, which requires the system to be reset, is the term "crash". Usually, it is not obvious why the control system malfunctioned or crashed because the problem does not seem to reoccur after the system has been reset or initialized.

However, in accordance with one feature of the present invention, by careful investigation of the types of failures that occur in a tested system causing malfunctions, in particular crashes, it is possible to develop a list of key operations to be monitored. The monitoring of these key operations can indicate either an immediate problem or a condition that would lead to a severe control problem. It is possible to check a sufficient number of these key operations and yet maintain system performance and adequate machine or process control. Appendix A is a sample list of key performance parameters which can be monitored.

As an extreme case of the type of software malfunction to be avoided, assume that the command to "turn off fuser" is garbled, lost or never executed. There is then a real danger of stressing the operation of the fuser with possible severe machine malfunction. Various benchmarks to monitor to be able to avoid this type of control failure are available.

For example, these benchmarks include monitoring that the number of tasks or procedures to be completed by the control system is not beyond the capacity of the control system to respond. Another benchmark would be to determine that the communication system has more than the expected number of requests to be made and would be forced to drop or ignore further requests. In general, any complex control system has numerous limits. When these limits are exceeded either because of a malfunction, software error, or because of the nondeterministic nature of real time control, the control system is in danger of erroneous operation. In prior systems, one of the following actions happen:

(1) Tables were prematurely overwritten causing information to be lost, thus causing erroneous operation of the control system.

(2) Requests were delayed until the table information had caught up. An example of this is a magnetic tape drive controller. Since this is typically a noncritical application, all write requests can be suspended almost indefinitely. In a real time control system, most events must be performed within a specific time window or misoperation will result. Indefinite suspension of operations obviously jeopardizes the timely completion of some operations.

In accordance with another feature of the present invention, once a fault has been detected, the recognition of the fault can provide valuable control information. With reference to the diagram illustrated in FIG. 4, here is illustrated the response to a fault detection. Fault information is recorded and available for Tech Rep diagnostics or to maintain machine operation. After the crash or fault detection (block 100), there is merely the isolation of the fault to a particular control board (block 102). This information is recorded in nonvolatile memory for later use by the Tech Rep.

There is also the automatic recording of the history of faults in suitable counters related to the various control boards as illustrated in block 104. This history of faults in each particular control board is much more valuable then merely identifying the board causing a crash after a particular crash since it is vital for the Tech Rep to know the pattern of where crashes are occurring.

The next step is to monitor a crash display enable flag in nonvolatile memory (block 105). If the flag is not set, the control will proceed with a contorl board reset procedure (block 106). If the flag is set, the machine enters a crash display routine (block 107). The crash display enable flag or location in nonvolatile memory is set by the Tech Rep to place the machine in the display mode. Once in the display mode, the Tech Rep can examine RAM, nonvolatile memory, and other registers to provide valuable diagnostic information.

It is undesirable for the operator to be required to power up the machine after a software crash. Therefore, after the fault detection, an automatic hardware reset procedure will reset all the control boards of the machine and the machine will be allowed to resume operation. This is shown in block 106. All control boards will be reset regardless of which particular board or boards caused the crash.

In a second level of machine operation response, block 108, only the particular control board causing the crash or fault will be reset. This eliminates the need to re-initialize those control boards not causing the crash. It enables the saving of status and operating information in the board RAMs that would have been lost during reset. These first two levels are basically hardware reset procedures to recover from a crash unnoticed by the operator.

In a third level of machine response, block 110, the fault is in one of the control boards and that particular control board fails reset. That is, there is a hardware failure related to the particular control board causing the crash. However, if it is a noncritical hardware component, that is, if the failed component is not crucial to machine operation or control, machine operation can continue either unaffected or only slightly degraded.

For example, if the failed control board controls a display that is not essential to the operation of the machine, the control board and display can be ignored by the rest of the control system until the control board has recovered. Machine operation can continue without the use of the device controlled by the failed board. Generally, this situation would be noticed by the operator since the display would be blank for a few seconds until it had recovered.

The final level of machine operation response, block 112, is the indication of a crash or failure of a control board that cannot be reset and it is critical to the machine operation. This can be termed a critical hardware failure. At this point the machine must be stopped and corrective action taken such as a jam clearance. At this particular level, in response to the software crash or malfunction, the machine can be cleared and totally recovered. That is, the parameters of the interrupted job remain intact. These parameters are saved and restored for the machine to continue on with the job in progress at the point of the malfunction. It should be noted that each of the levels of response is a further feature of the present invention and will be described in more detail.

Figure 4:
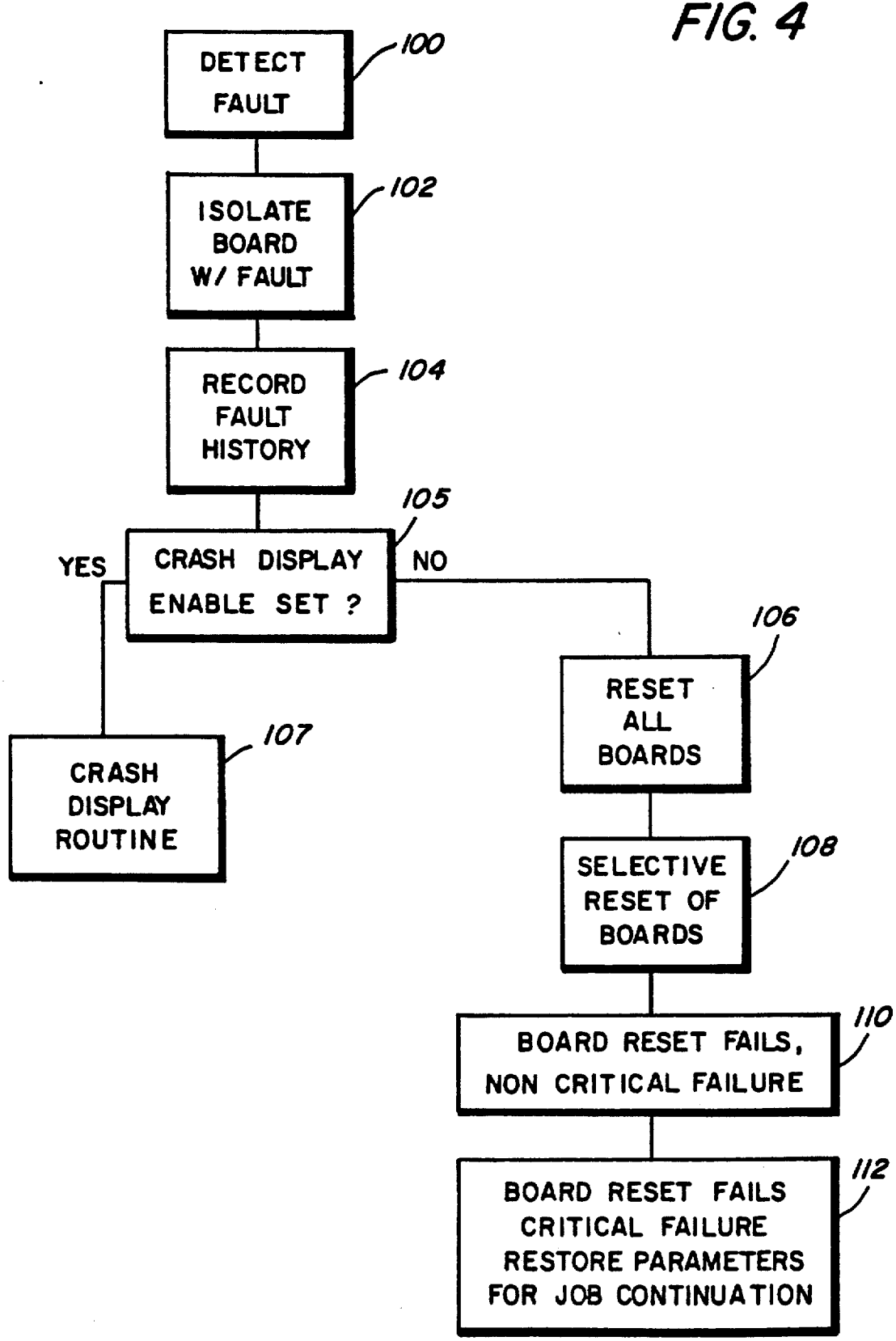
FIG. 4 is an illustration of the levels of machine recovery and diagnostics upon detection of a software crash.

According to one feature of the present invention, various errors and faults are recorded by the CPM board 70 (FIG. 4, block 100). These faults are conveyed by the CPM board to the control panel 86 for display. With reference to FIG. 5, a preferred embodiment of control panel 86 is illustrated. There is also shown a display panel 120. The control panel 86 is electrically coupled to the CPM board. The display panel 120 is electrically coupled to the DCR remote control board 78.

The control panel 86 allows an operator to select copy size (button 122), copy contrast (button 124), number of copies to be made (keys 126), and the simplex or duplex mode (button 128). Also included on panel 86 are a start button 130, a stop button 132, an eight character 7 segment display 134, a three character 7 segment display 136, and a job interrupt button 138. The displays 134, 136 provide the operator and Tech Rep with various operating and diagnostic information.

The display panel 120 informs the operator of the status of the machine and can be used to prompt the operator to take corrective action in the event of a fault in machine operation. The display panel 120 includes a flip chart 140, a Liquid Crystal Display (LCD) 142, an alphanumeric display 144 and a "Power On" button 146.

In the event of a software crash, a coarse code is provided, giving the reason for the crash. This coarse code will be automatically displayed on the control panel 86 on display 134 if the machine has been so programmed by the Tech Rep in NUM; i.e. the crash display flag is enabled. The coarse codes generally identify the particular control board that failed.

A fine code is used to indicate in more detail the cause of the failure of a particular control board. The fine code is obtained by pressing the stop key 132 and looking at the right most two digits on the display 134 on the control panel 86. Preferably, the fine code (error code) will be displayed in hexadecimal on the control panel 86. As an alternative, a decimal value of the fault code is found in nonvolatile memory using a diagnostics procedures.

Typical of coarse codes would be X'1F' or decimal 31 indicating a CPM board 70 fault. That is, an error occurred on the CPM board 70. The fine code is then used for the specific error. Another example of a coarse code would be X'5F' or decimal 95 indicating no acknowledgement from the XER board 74. That is, the CPM board 70 sent a message to the XER board 74 and after three retransmissions of the message, the XER board failed to acknowledge receiving any of them.

Other coarse codes would be to indicate that the CPM board 70 sent a message to the MIR board 76 or to the DCR board 78, and after three retransmissions of the message, the DCR or the MIR board failed to acknowledge receiving any message. Still other coarse codes are to indicate that the CPM board tried to communicate with an unidentified processor, or that the MMB board 84, for example, failed a background checksum. It should be noted that many other codes are available. Those listed are merely exemplary.

The coarse code and a fine code together describe the failure. Thus, if the coarse code is X'5F' and the fine code is X'0A', the XER board 74 failed and the specific failure was a timer failure. Various other Fine Crash Codes are listed in Appendix A.

The first level of the Tech Rep response to a fault indication, block 102 as shown in FIG. 4, is to isolate the particular control board having the fault. This information is recorded in nonvolatile memory.

In accordance with another feature of the present invention, one of the control boards, in particular, the CPM control board 70, is designated as the master. All the other processors or control boards report their faults to the master. In other words, failures to communicate over the shared line by a particular remote control board or failure, such as a timer failure on a particular remote board, generates an error signal conveyed to the CPM board.

When the CPM control board 70 receives a fault message, it will record the type of fault and the source of the message in suitable memory locations, preferably in nonvolatile memory. This data is preserved for Tech Rep diagnostics. It will also time stamp the fault so that the first fault message is identified. That is, the CPM board will check Machine Clock pulses and record the count along with the error message.

Next, the master or CPM board 70 will transmit a message to itself. That is, the CPM board 70 will transmit a message to itself that simulates a message being received by the CPM board over the shared communication line. This will verify whether the master's communication channel is valid, in particular to verify the CPM board's receiver circuitry. This is done to identify the case that the remote control board sent a valid response, but the CPM board did not receive it. In this case, the master or CPM board 70 will be identified as being faulty.

This provides the means to collect fault information as a remote control board begins to fail. It is particularly valuable in identifying the first of a possibly linked series of subsystem failures that can be traced to the first board to send a fault message.

In accordance with another feature of the present invention, each controller board has designated counters or storage locations in nonvolatile memory. These counters enable the control system to record the fault history of each control board. This is the second level of diagnostics shown as block 104 in FIG. 4. Each of the control boards has one counter designated in nonvolatile memory to record instances of malfunctions or crashes. Another counter records instances of machine crashes during machine run or operation.

Figure 6:
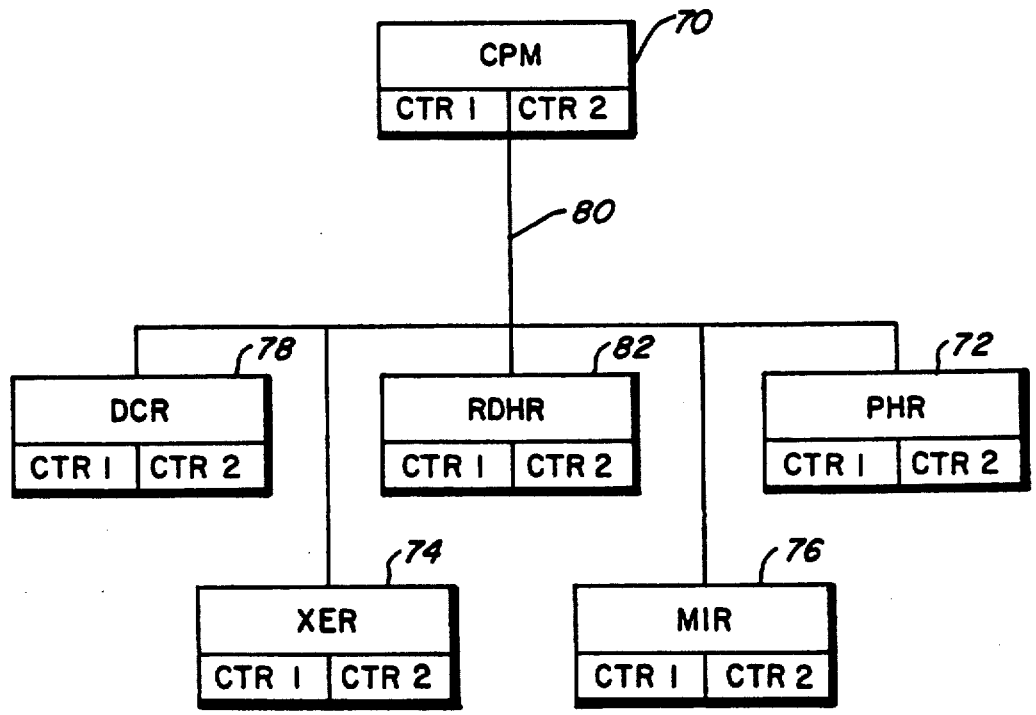
FIG. 6 shows the power up and run time crash counters on each of the control boards in FIG. 2.

Distinguishing between power up and run provides fault history to draw various conclusions about the operation and type of malfunction. With reference to FIG. 6, there is illustrated associated with each of the control boards, specifically the CPM, RDH, MIR, XER, DCR, and PHR, boards, a pair of counters. The counters are illustrated as being on the various control boards. However, in a preferred embodiment, all counters are located in nonvolatile memory on the CPM board 70. Since crashes can be reset and the machine can then run again, there will probably be several crashes before the Tech Rep actually services the machine. Counter 1 is associated with each of the control boards to record crashes for that particular control board during both standby and machine run. Counter 2, although illustrated for each control board, in the preferred embodiment is actually only one counter to record all instances of crashes during machine run only. It is a cumulative count of crashes for all boards.

The Tech Rep preferably only clears those nonvolatile memory locations associated with control boards having problems corrected by the Tech Rep. In this manner, the system can be used to record problems only occurring on an infrequent basis then the control can record and have available problems that it had even if only on a very infrequent basis. It is possible to distinguish intermittent control board problems from intermittent problems that are not associated with the control boards, such as noise. Nonboard problems such as noise and software design errors are usually caused during machine running.

For example, a failure during both power up and machine run is a good indication of board failure. The board failure could be either the board itself or, under rare circumstances, the software associated with the board. However, suppose there is no failure noted during power up and the control board self test, but a problem, even though intermittent, is observed during run. This is a strong indication of noise or some intermittent running problem. That is, nonboard problems are usually caused by noise from some machine component when it is running.

If there is no indication of failure for a particular board during standby, there is a very low probability that that particular board itself is bad. A failure only during run would likely indicate noise. It should be noted that fault recording (block 104, FIG. 4) need not necessarily occur before the reset of the control boards. It could occur, for example, after reset and restoration of parameters, i.e. after block 112.

A control system software crash means that the system is not functioning correctly. The usual response is to reset or re-initialize the system. In other words, various registers are cleared, in particular various Random Access Memory locations are re-initialized. In most cases the problem causing the software crash will disappear during the re-initialization and will not effect the system. If the system only has an automatic reset mechanism, memory will be initialized and valuable diagnostic information residing in RAM is lost after reset. In short, RAM locations often contain information on the nature and type of a particular software crash.

In accordance with another aspect of the present invention, there is an automatic reset disable feature. This feature allows a Tech Rep to place the machine into the crash display mode if a crash occurred. Preferably, the automatic reset is disabled through a suitable switch. For the Tech Rep, forcing the system software to crash can be a valuable diagnostic tool. For example, if the Tech Rep suspects a software problem, he can force the machine to software crash and then interrogate various RAM locations for crash related information.

Typical of the sequence of events that might occur, the CPM board 70 may have an incorrect value in memory. It may be that the system can reset and ignore the problem temporarily. However, the problem may occur relatively frequently. Suspecting a problem, the Tech Rep will begin to isolate the cause. The Tech Rep will first verify the operation of the microprocessors and the RAM controls. The Tech Rep can then force the machine into a software crash and display the contents of RAM. The display of the RAM contents will occur after the reset of all the boards except the CPM board 70.

In a preferred embodiment, the Tech Rep, using a special routine, sets a predetermined nonvolatile memory location to a certain value. This causes a display of software crash if a crash occurs. If a crash occurs, the display 134 on control panel 86 will show the word "error" on the lefthand side of the display 134. Various two digit code numbers on the right of the display represent the processor board where the failure occurred.

With the word "error" displayed, the Tech Rep has the capability to read the content of RAM locations. Certain control panel buttons then provide the Tech Rep with certain capabilities. For example, with the stop print 132 button initially pushed, the control panel display 134 will show the location of the address of the crash code on the left with the contents of that location on the right. The location is correctly defined as "E1E0". Further actuation of this button will increment the lower byte addresses, displaying the new location and its contents.

Further actuation of the job interrupt button 138 will increment the higher byte addresses, displaying the new location and its contents. For example, if the address or the display is currently "E000", actuating this button will cause the address to increment to "E100". Whenever the "clear" key C is pushed, the crash display will be terminated, coarse and fine code memory locations in nonvolatile memory are cleared and a self test initiated.

As an example of RAM diagnostics, the error 1F/81 indicates an invalid activation address on the CPM board. This error results from a task trying to execute in an area of memory not intended for execution (for example, input/output ports, vector address area, RAM and nonvolatile memory). The error occurs as a task is about to jump to its next instruction. This means that the task must have already put the bad address in its Task Control Buffer before the execution was attempted.

Much of the time, noise is the culprit for an 1F/81 error caused by loosely connected input connectors. However, this error can also be caused by software. The following procedure is used to identify the source.

First, the Tech Rep fills out the Task Control Buffer (TCB) information for the currently running task. The Task Control Buffer (TCB) is a RAM table that merely contains information relative to a particular task that is being executed. Such information includes data and priority information for relationships to other tasks. The currently running task is found in $CURRENT_ID which is at address F361.

From this information, the Tech Rep can make certain judgements. In particular, he can predict if the problem is noise and check the connectors, or if the values that he reads are within a certain range, it might indicate a software problem. As an example of how the Tech Rep relates various address locations with various information reference is made to FIG. 7.

Figure 7:
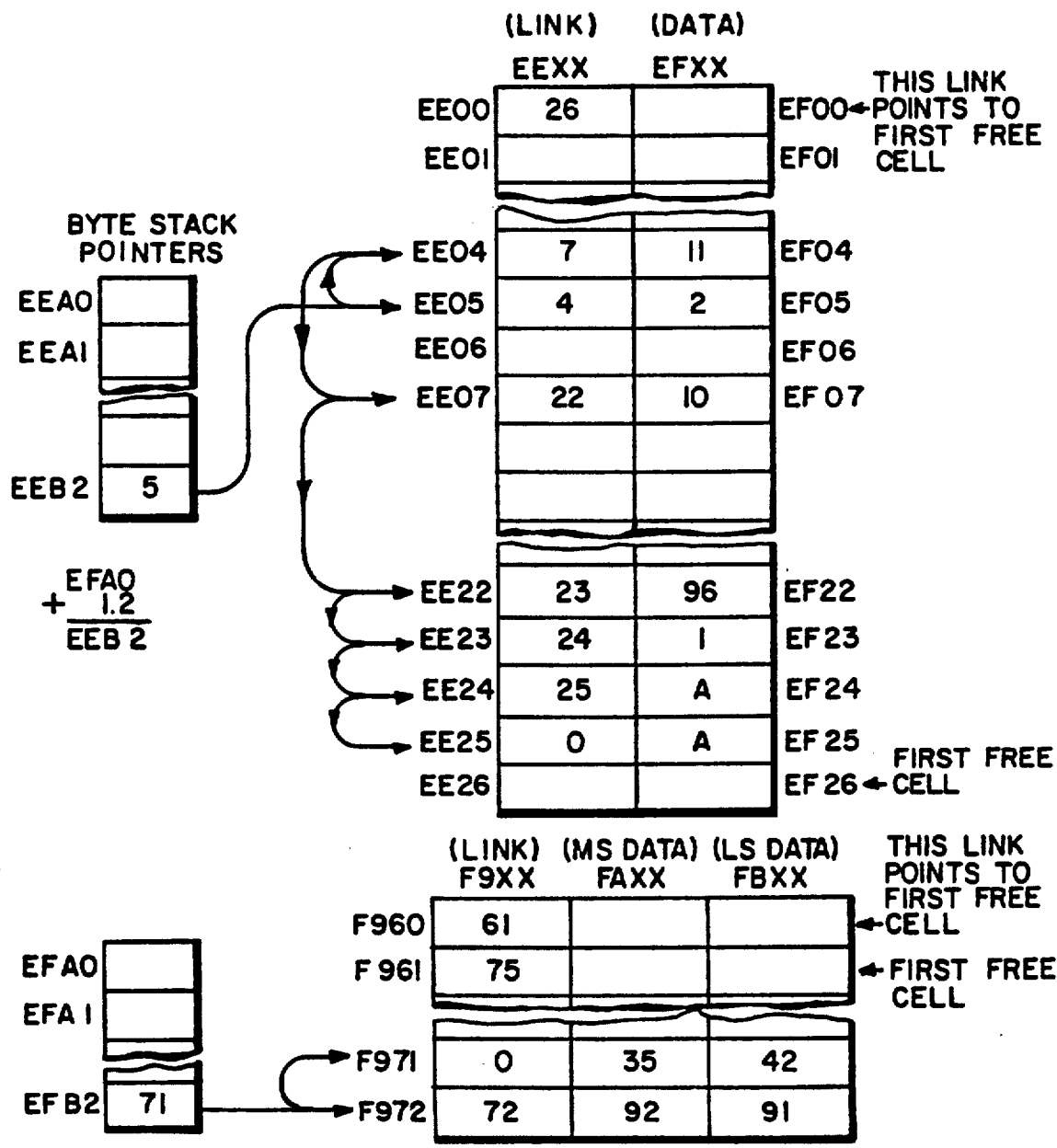
FIG. 7 is an illustration of the relationship of addresses and Task Control Buffer data in displaying RAM contents.

Each task receives its parameters in a stack called the correspondence or byte stack. A pointer to the first element in the stack is found in the Task Control Buffer (TCB) table or pointer starting at EEA0. To get the pointer of task X, look at memory location EEA0+X. This pointer is the least significant value of the address of the first element in the stack. The most significant byte of the address is hexadecimal address 'EE'. Thus, to get the element that X points to, look at location EE00+the contents of EE00+X. This will contain the pointer to the next element of the list, or zero if this is the last element. The contents of memory location EF00+X contains the data for that element of the stack. For example, the correspondence stack (2, 11, 1D, 96, 1, A, A) (top to bottom) might look as shown in FIG. 7 if it were the stack for task 12.

Each task also has a word stack, which is used for saving information while the task is running. It uses the same format as the correspondence stack, except that there are two data fields (one for the least significant byte of the word, and one for the most significant byte). Typically, there will be only one or two entries on the stack. The address for the TCB word stack pointer starts at EFA0, and the stack is located at F9XX, FAXX and FBXX. The crash counter and crash display routines are illustrated in Appendix D.

Again, with reference to FIG. 4, there are shown the various levels of machine recovery upon detecting a software crash. A concern with a multiprocessor control system is to synchronize all the processors of the system. This is particularly important whenever a system abnormality or software crash occurs.

In accordance with another feature of the present invention, one of the processors or control boards is given the role of a master control from the standpoint of simultaneously resetting the other controller boards, FIG. 4, block 106. When a system abnormality or software crash occurs, the master control issues a global reset signal. This signal goes automatically to each of the other processors or control boards in the system.

The global reset signal will resynchronize the other processors or control boards in the system back to a normal state of operation. Since many of the abnormalities and system software crashes are transient, the multiprocessor system is reset and the system continues to function without requiring any manual power up or other resetting. In a preferred embodiment, the CPM control board 70 is given the role of master control for resetting the other control boards.

Figure 8:
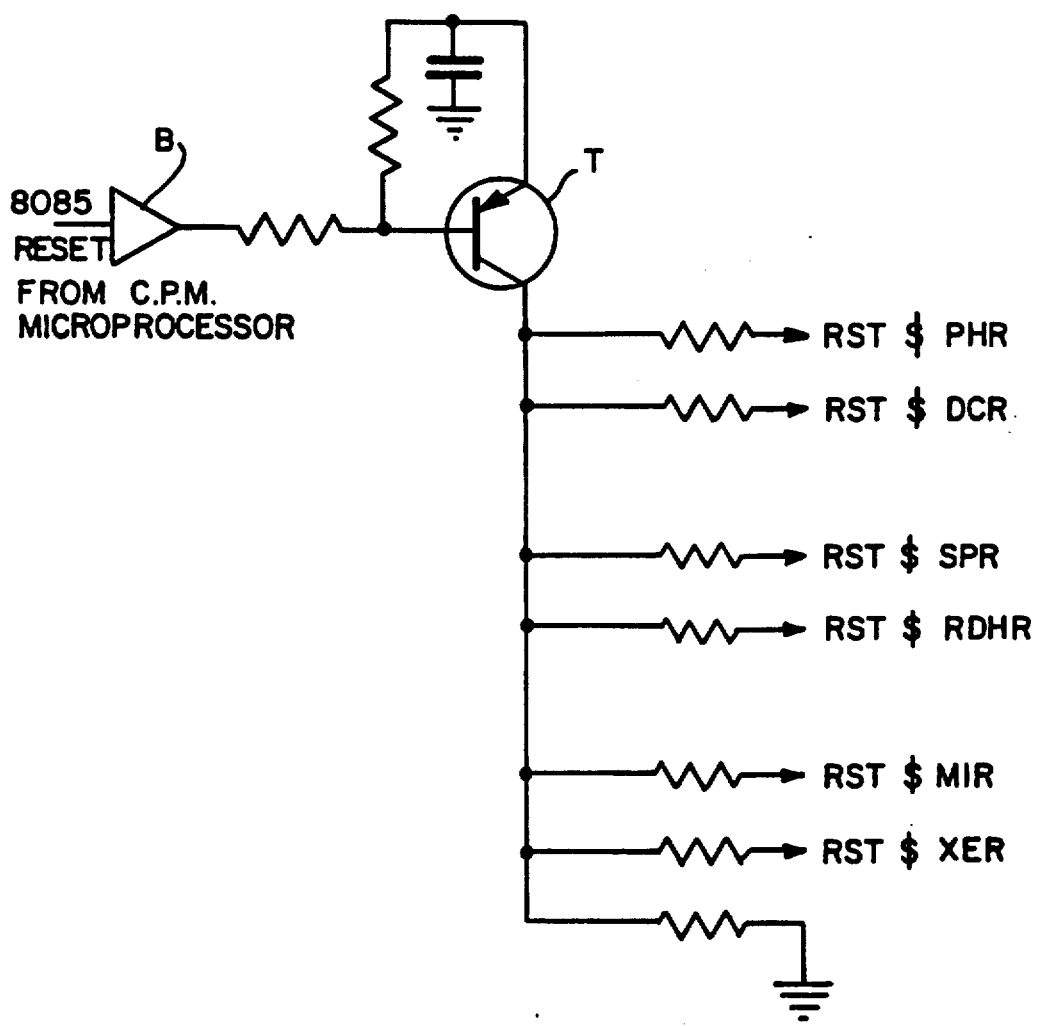
FIG. 8 is a schematic for resetting the control boards in a multiprocessor system.

With reference to FIG. 8, there is shown reset circuitry on the CPM control board 70. The reset circuitry provides suitable reset signals to the PHR, XER, MIR, DCR and RDHR, control boards 72, 74, 76, 78 and 82. The reset circuitry holds the other control boards reset during the normal power up and power down operations. This allows the CPM control board 70 to insure its proper operation before it allows the other control boards in the system to start their normal operation. Thus, if the CPM board detects its own operational problem, it can hold the remaining control boards in a safe condition.

The reset control includes an 8085 reset signal from the Intel 8085 microprocessor on the CPM control board 70. The 8085 signal, set to 0, is fed to a buffer B to gate the transistor driver T. The transistor T provides a suitable reset signal simultaneously to each of the control boards through suitable resistor networks.

In particular, the transistor T is shown providing the RST$PHR, RST$RDHR, RST$DCR, RST$MIR, and RST$XER signals. Preferably, a reset signal spare (SPR) is provided for any additional control boards that may be added to the system.

In a second level of hardware reset circuitry, FIG. 4, block 108, the master controller (CPM board 70) in the multiprocessor system provides for the selective resetting of the other individual control boards in the system. Thus, any type of abnormal operation in any one of the processors or control boards, will not force all the other control boards to be reset. Resetting all the control boards may cause the control boards to unnecessarily lose status and operating information.

It is possible, therefore, if a system problem occurs, to reset one remote control board without losing valuable status information in other control boards. The master controller need only look to the crashed remote control board to determine proper function of the system.

Figure 9:
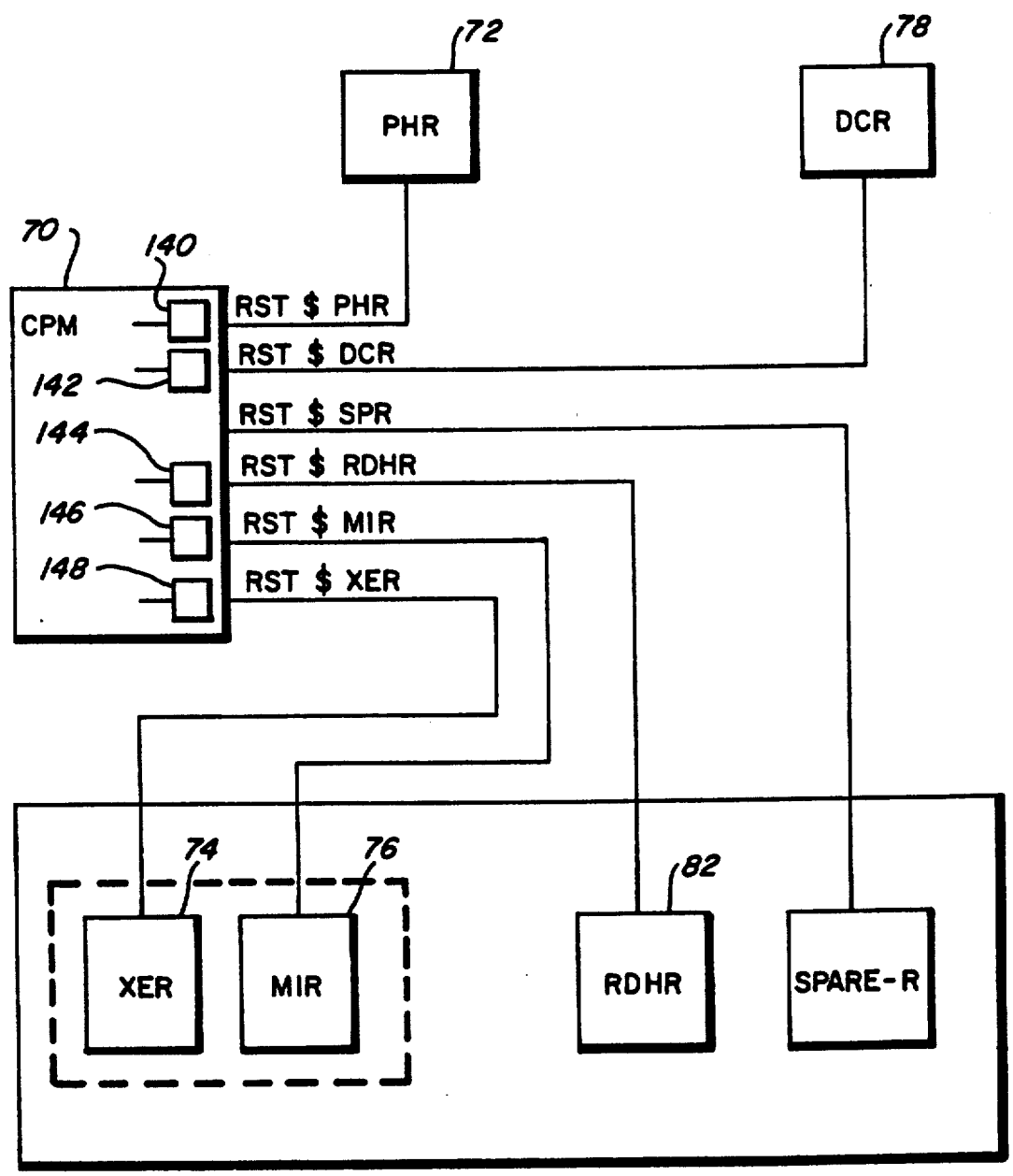
FIG. 9 is a schematic for selective resetting of a particular control board in a multiprocessor system.

With reference to FIG. 9, there is shown the CPM control board 70 with reset lines to the PHR board 72, the XER board 74, the MIR board 76, the DCR board 78 and the RDHR board 82. There is also illustrated individual reset circuitry for each of the reset lines. In particular, reset circuitry 140 on CPM control board 70 controls the reset of the PHR control board 72, reset circuitry 142 controls the reset of the DCR control board 78, and reset circuitry 144 controls the reset of the RDHR control board 82. In addition, reset circuitry 146 controls the resetting of the MIR control board 76 and reset circuitry 148 controls the resetting of the XER control board 74.

These separate reset lines are independent of the shared line 80 interconnecting the various control boards. There is also illustrated a spare control board that could be suitably interconnected to additional reset circuitry. The reset circuitry 140, 142, 144, 146 and 148 is shown in more detail in FIGS. 10a through 10e.

Figure 10A:
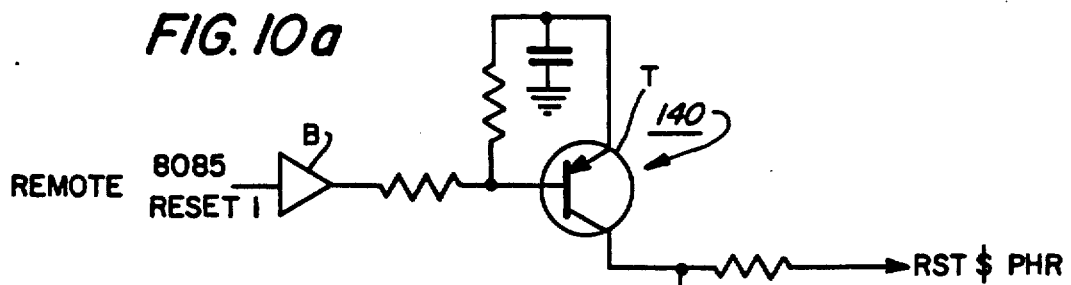
FIGS. 10a–10e show in more detail the resetting as illustrated in FIG. 9.
Figure 10B:
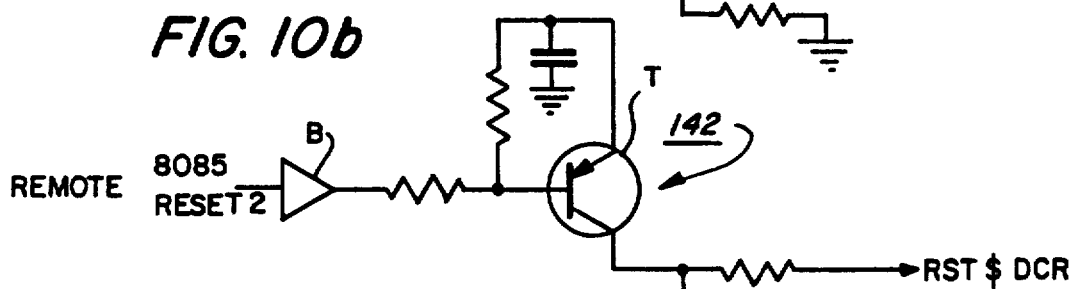
Figure 10C:
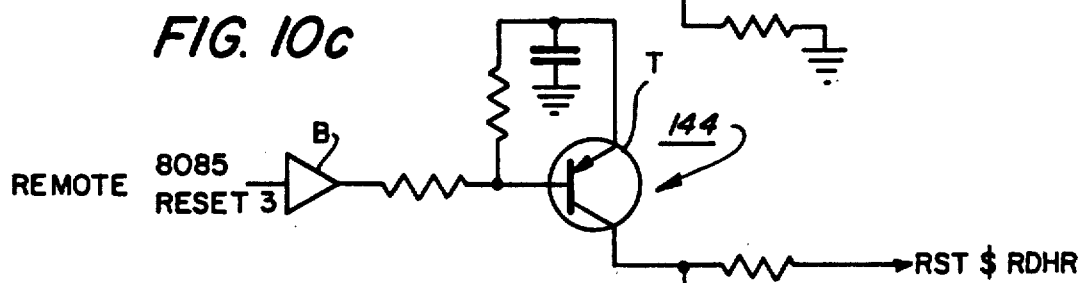
Figure 10D:
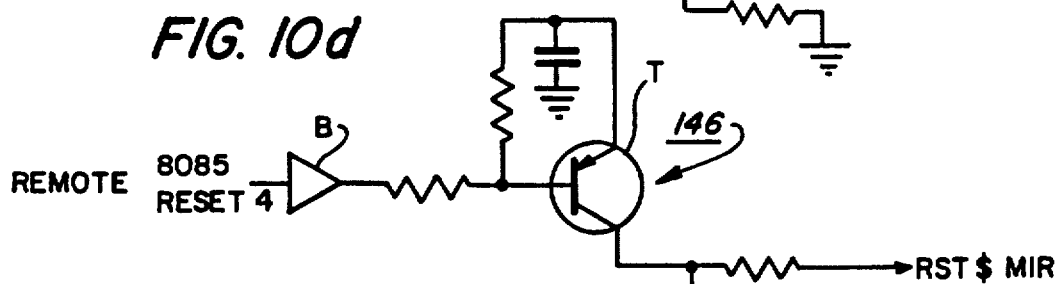
Figure 10E:
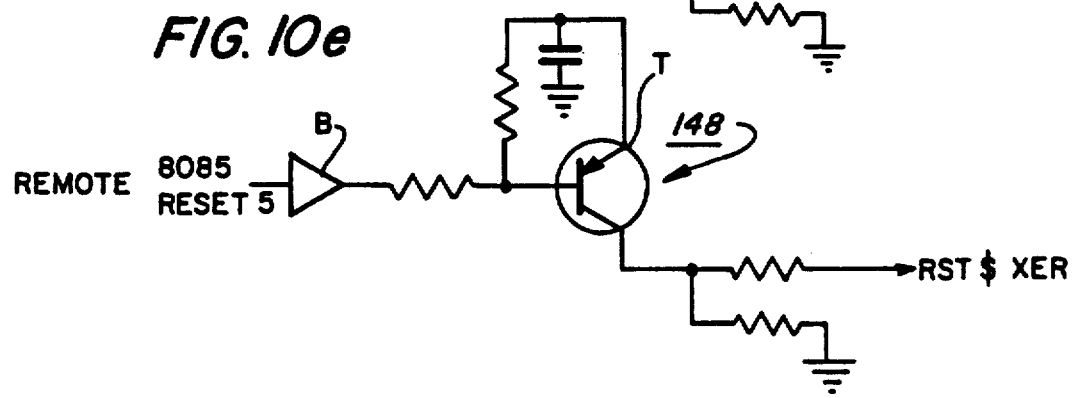

In particular, FIG. 10a illustrates the reset circuitry 140 on CPM board 70. The reset circuitry includes the Intel 8085 reset signal to buffer B, in turn driving transistor drive T to provide a separate reset signal RST$PHR to the PHR control board 72. Reset circuitry 142 as shown in FIG. 10b includes the 8085 reset signal to a separate buffer B, in turn driving its own transistor driver T to provide a separate reset signal RST$CDR to the DCR control board 78. Similarly, separate reset circuitry shown in FIGS. 10c, 10d and 10e provides suitable separate reset signals to the RDHR, MIR and XER boards 82, 76 and 74.

A problem can occur where a remote control board processor prevents the board from responding back to the CPM control board that it is functioning normally. The CPM control board then resets this one remote control board individually. If the remote control board is not functioning properly, the CPM board can hold the one remote board in reset. In addition, it should be noted that there are various resetting and self test procedures initiated at machine start up. There is an automatic self test to check the control logic circuitry on the control boards. During the automatic self test, any fault that is detected is displayed by suitably mounted LEDs.

There are three major checks, namely the check of the CPM and MMB boards 70, 84, the remote board tests, and shared communication line 80 test. During the test of the CPM and the MMB boards 70, 84, the status of a not shown low voltage power supply is checked as well as the continuity of the connection between the control panel 86 and the CPM board 70.

Also, during this test, the CPM board 70 writes information into a small portion of the nonvolatile memory. Thus, when the copier power is on, the low voltage power supply is conveying power to the nonvolatile memory 88 and charging the battery. When the copier is switched off, the nonvolatile memory is relying on the battery to hold its contents.

During the tests, the information in ROM in the CPM board 70 that is written into the nonvolatile memory is compared. If the two memories do not match, a battery fault status code is declared. Also, the CPM board 70 writes a small portion of information into nonvolatile memory and then reads the same information. If the information is not matched, a nonvolatile memory fault code is declared. the same information. If the information is not matched, a nonvolatile memory fault code is declared.

After the CPM and MMB board tests have begun, the CPM board 70 conveys a reset signal to all the remote control boards 72, 74, 76, 78, and 82 to start the self test of each of the remotes. When the reset is received from the CPM board 70, each remote simultaneously starts its own self test checking for a remote control board processor fault, an input circuit fault or an output circuit fault.

A processor or control board fault is declared when a remote control board cannot communicate with the CPM board 70. That is, the control logic on the remote control board cannot perform its basic test of its hardware devices. There is also a DC input self test to verify operation of the DC input circuitry on all the remotes and a DC output self test to verify the DC output circuits on all the remote control boards.

Finally, there is a shared communication line 80 test to test the shared communication line logic on the CPM board 70, the shared communication logic on the remote control boards and the shared communication logic cable. The CPM board 70 attempts to send and receive a signal to and from each of the remotes in sequence. When the CPM board 70 successfully sends and receives signals from the remote control boards, the CPM board 70, the remote control boards and the shared communication line 80 are verified.

In accordance with another feature of the present invention, the failure of a remote control board to reset does not necessarily inhibit machine operation (block 110 of FIG. 4). In particular, if the particular control board failing reset is not critical to the overall machine operation, the machine continues operation. The machine continues operation even though the particular board is not operational. The DCR control board 78 is an example of a control board that is not crucial to machine operation.

When a Display Control Remote (DCR) board 78 crash occurs two alternatives are available. In one embodiment, a flag or crash enable byte is set in nonvolatile memory. The application software will monitor the flag to determine if it is necessary to go to crash display routine for the Tech Rep or not. This is done by the CPM board 70 looking at the crash enable byte in nonvolatile memory.

If the crash enable byte is set, that is, no go to crash display routine for the Tech Rep, the CPM board 70 will reset all remotes, including DCR and goes to crash display routine with a message "Error 8F".

If in the recovery mode, there is still a DCR power up reset procedure. After completion of a DCR self test, the CPM board will attempt to communicate with the DCR board 78 by polling the DCR board. If the communication is successful, the CPM board 70 will send for DCR board status and allow normal communication to the DCR. If the communication is not completed, no further communication will be allowed to the DCR board and the machine will continue to run as though the DCR does not exist.

In a preferred embodiment, however, there is no crash enable byte to be monitored. There always is an automatic attempt to recover the DCR board after a software crash during machine run. In general, in the preferred embodiment, the DCR operating system will send status messages to the CPM board for the following two conditions:

(1) At power up (or whenever DCR gets reset) after the DCR has passed self test.

(2) At a software crash, whenever a fatal fault is detected on the DCR board.

The DCR recovery strategy follows the following sequence:

(1) There is an indication that the DCR board is dead. There is then a request from the CPM board 70 to the DCR board 78.

(2) The CPM board 70 reads or acknowledges that the DCR board is dead.

(3) The CPM board attempts to reset the DCR board.

(4) After a delay of five seconds, there is a test to see if the DCR board has recovered.

(5) If the DCR board has not recovered, the system will try again. Messages will not be lost from the system as they will be retained in the CPM RAM and be annexed to an initialized package when the DCR is eventually recovered.

For example, if there is a critical faulty component on the DCR board 78, that has not intermittently failed, the DCR board may never be reset and the messages will never be displayed. However, there may be noise related crashes that will cause the display to indicate a fault. These causes may be transient and ultimately the DCR board will recover.

Therefore, even though for each message request to the DCR board, it was determined that the DCR was dead, ultimately the DCR board may be recovered. At this time, the system will initialize and update all messages that were initially lost. In particular, the messages that had been saved in the CPM RAM will finally be dumped into the DCR board RAM table. The DCR will then display the most valid or current message to the display.

Of course, if the DCR board 78 cannot be recovered, the machine will continue to run and the DCR board will remain blank. The DCR recovery procedure is shown in Appendix B.

The final level in machine recovery is to completely restore the interrupted job after a critical software crash or failure. This type of crash recovery can be considered full job recovery after a system crash. The machine resets itself, and with some operator intervention, job integrity is preserved (FIG. 4, block 112).

In one embodiment, in response to software crash or malfunction, one of the processors of a multiprocessor control again assumes the roll of the master controller. In particular, the CPM board 70 is the master controller. At the time of the crash, a software flag, typically a bit in the memory could be monitored. This flag would indicate to the CPM board 70 that there should be no destruction of the contents of the random access memories. This monitoring would be done prior to any initiation or reset sequence of the control boards.

In particular, the CPM board 70 would indicate to itself not to destroy the contents of RAM location that contained the necessary parameters. These would be the parameters needed to place the CPM board and the other control boards into the same state as before the occurrence of the crash. In other words, the CPM board 70 would reset the other control boards using the standard diagnostic and checking procedures, but would retain the information in RAM locations necessary to recover the other control boards with the appropriate information in tact.

The primary purpose of crash recovery, however, is to maintain job integrity by saving the essential variables to be able to continue the job after the crash. The essential variables are such things as the selected information from the control panel such as quantity selected, magnification ratio, two-sided copying and copy quality. Other essential information is state and status information of the machine at the time of the crash. The most reliable means to preserve this information is to store these variables in nonvolatile memory rather than RAM and to continually update the information in nonvolatile memory as it changes.

In a preferred embodiment, therefore, all the control boards automatically perform job recovery and all key information is continually updated in nonvolatile memory. By way of example, if the machine is in the print state or paper has reached the fuser area, after a crash, an E10 fault will be declared. This instructs the operator to clear the entire paper path.

Once this fault is cleared, the job progresses according to the following re-initialization procedure. If a recirculating handler is in the system, then the RDHR control board 82 receives a fault signal from the CPM control board 70 that there is a crash. The RDHR control board 82 then immediately declares a fault, A10, that instructs the operator to remove and reorder the documents in the document handler.

By this time, the CPM board 70 Operating System has reset and re-initialized all the remote control boards, in particular clearing all of the information stored in RAM. Next, the Operating System restores the relevant variables in the nonvolatile memory 88 on the CPM board 70 to the appropriate RAM locations on the remote boards. In particular, the CPM board 70 updates the control panel 86 with the job selected parameters at the time of the crash and restores the remote control board status.

For example, the RDHR board 82 is told the number of originals in a set and the CPM board 70 instructs the RDHR board 82 to cycle the sheets until the correct sheet is on the platen. Other restored information would be, for example, the number of sheets already delivered to a sorter, along with the bin number to start additional sorting if necessary. Note that in a preferred embodiment, there are approximately 116 variables deemed necessary to be used for crash recovery and automatically updated in nonvolatile memory as required.

If a software crash occurs in a standby mode, the machine is reset and the control panel is refreshed unchanged. If stop print has been pushed and the machine has cycled down, recovery is identical. If a software crash occurs in the middle of the second job during a job interrupt, crash recovery is identical to a noninterrupt job. In particular, the second job continues where it left off as if no software crash occured. After completion of the second job, the interrupted job with its variables stored in nonvolatile memory continues from where it was interrupted.

With reference to the code Appendix C, there is shown the software recovery procedure. If, however, crash recovery is selected, statements 142-147, a crash recovery flag, in particular a byte of memory in RAM and the CPM is set. Then, if there is a recirculating document handler, the RDHR control is informed of a software crash. After an E10 fault has been declared and if a crash is in the interrupt mode, the interrupt light is turned on. In addition, the selected job before the crash is restored. In particular, there is an update of a seven segment LED display 134 including quantity flashed and the number of copies selected, statements 804-816.

There is also a re-initialization of the remote control boards. That is, the appropriate variables stored in nonvolatile memory on the CPM board are downloaded to the appropriate RAM locations in the remotes, statements 817-827.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

APPENDIX A

| DEC | HEX | MESSAGE AND DESCRIPTION |
|---|---|---|
|  |  | FINE CODES FOR CPM |
| 131 | X'83' | No More TCBS<br>A task made a request to START/FORK/CALL a local task or to FORK/CALL a remote task and there were no TCBs left for the new task. |
| 133 | X'85' | Attempt To Release A Free TCB<br>A request was made to release a TCB to the list of unused TCBs and that TCB was already released. |
| 134 | X'86' | Invalid Task ID In Conditioner<br>An attempt was made to access a condition variable in a task whose RTID was not within the proper range. |
| 140 | X'8C' | Empty Corres Buffer<br>An O.S. Instruction routine tried to retrieve a correspondence byte from an empty correspondence buffer. |
| 141 | X'8D' | Empty Control Buffer<br>An O.S. Instruction routine tried to retrieve a control word from an empty control stack. |
| 150 | X'96' | Join Corres Buf Not Empty On End<br>When a forked task hits its END statement, it will swap correspondence with its Parent. If the Parent's correspondence stack is not empty at that time, the Child will try to end with a non-empty stack. This is usually caused by passing the wrong number of arguments to the Parent. |
| 152 | X'98' | No Task To Join<br>The current task requested to JOIN to a nonexistant task. |
| 153 | X'99' | Unexpected OS Will Executed<br>An O.S. task that should not have had a Will somehow tried to execute its Will. This can be caused by CANCELLING an O.S. task by mistake. |
| 158 | X'9E' | SCH Enter Task Already Scheduled<br>An attempt was made to enter a task that was already entered. |

APPENDIX A-continued

| DEC | HEX | MESSAGE AND DESCRIPTION |
|---|---|---|
| 156 | X'9C' | SCH Enter Invalid Priority<br>The value in SPRIORITY VALUE was not valid when the enter was performed. |
| 160 | X'A0' | SCH Start Invalid Priority<br>The Parent's priority was invalid and that would make the Child's priority invalid too. |
| 163 | X'A3' | SCH Release Task Not Scheduled<br>Tried to release a task that is not spooled or queued. |
| 165 | X'A5' | SCH Free Invalid Priority<br>Tried to free a task whose priority entry is invalid. |
| 170 | X'AA' | SCH VIP Activate ERR<br>Tried to activate a task that was not set up to be activated. |
| 180 | X'B4' | Timer Duration Too Large |
| 182 | X'B6' | Timer Still Active<br>Tried to start a timer that's already active. |
| 186 | X'BA' | MSG Too Long<br>An attempt was made to send a message longer than 16 total bytes across the bus. This includes 3 bytes of header, 2-3 bytes of task information, one byte length, and correspondence. Thus, you can only pass 10-11 bytes of correspondence to a remote task. |
| 187 | X'BB' | Bad Dest ID<br>The transmit routines have generated a bad destination ID. |
| 188 | X'BC' | Xmitter Fails Reset<br>The hardware in the transmitter isn't functioning properly. |
| 189 | X'BD' | RCVR Fails Reset<br>The hardware in the receiver isn't functioning properly. |
| 198 | X'C6' | Invalid OS Instruction Executed<br>An attempt to execute an undefined O.S. instruction was attempted. |
| FINE CODES FOR I/O CONTROL BOARDS | | |
| 2 | X'02' | Invalid TCB Status<br>The TCB just retrieved has an invalid status tag. |
| 3 | X'03' | Invalid Timer Status<br>The timer that just expired is neither a machine or real-time timer. |
| 4 | X'04' | No Ack<br>This I/O Control Board sent a message and did not receive an acknowledgement of that message. |
| 5 | X'05' | Backlog Full<br>I/O control Board's transmitter backlog is full (i.e. it cannot queue any more messages for transmission. |
| 10 | X'0A' | SCC Real Time Timer Failure<br>A "Real-Time" timer did not respond within the specified amount of time. |
| 131 | X'83' | No More TCB's<br>The maximum number of active tasks allowed in this IOP were exceeded. This might be caused by performing too many downloads to the IOP. |
| FINE CODES FOR DCR CONTROL BOARD | | |
| 132 | X'84' | Invalid Vector Address<br>A task executed an O.S. Instruction and its next 8085 Instruction to execute was not in the proper range. |
| 134 | X'86' | Invalid Task ID In Conditioner<br>An attempt was made to access a condition variable in a task whose RTID was not within the proper range. |
| 208 | X'D0' | Bad Chaining RTID<br>A chaining RTID with an invalid value was encountered. |
| 209 | X'D1' | Bad Chaining STCB<br>A chaining STCB with an invalid value was encountered. |
| 210 | X'D2' | Bad CTID In STCB Table<br>A CTID with an invalid value was encountered in the STCB table. |
| 130 | X'82' | No More Free Space<br>An attempt was made to allocate a correspondence byte or control word from its free space and the free space was exhausted. |
| 145 | X'91' | Exceeded Maximum Number Of Events<br>A task requested to start an Event and there was no room left in the Event tables for it. |
| 150 | X'96' | Join Corres Buf Not Empty on End<br>When a forked task hits its END statement, it will swap correspondence with its Parent. If the Parent's correspondence stack is not empty at that time, the Child will try to end with a non-empty stack. This is usually caused by passing the wrong number of arguments to the Parent. |
| 151 | X'97' | End Corres Buf Not Empty On End<br>A task reached its END statement and its correspondence buffer was not all used. This is usually caused by passing more parameters to the routine than it expected. |
| 152 | X'98' | No Task To Join Too<br>The current task requested to Join to a non-existant task. |
| 154 | X'9A' | Tried To Retrieve From An Empty Buffer<br>A task was expecting more parameters than it was passed. |

APPENDIX B

```
546        /*SPA.*/
547
548  7007  ENTER;
549  700E  IF DCRSWITCH THEN BEGIN;
550  700E     TEST USER@NUM;
551  700E        CASE=POLLREQUEST;
552  7016           CALL DISPLAY_INTERFACE
                   (USER@NUM,USER@DAIA);
553  7022        CASE=DCRRESET;
554  7027           TRANSMIT LOOP VARIABLE@POINTER
                   <-u 10 31;
555  7033              MESSAGE@COMMAND<-
                       RESE1PREFIX/VARIABLE
                       @POINTER;
556  703B              TEST VARIABLE@POINTER;
557  703B                 CASE=SENDFINISHED;
                          DCR@DAIA<-
                          SENDFINISHED;
558  704B                 CASE=SENDINOUTCONFIG;
                          DCR@DAIA<-
```

-continued

APPENDIX B

| | | |
|---|---|---|
| 559 | 705C | IN@OUT@CONFIG;<br>CASE=SENDIOCONFIG;<br>DCR@DAIA<-<br>IO@CONFIG; |
| 560 | 706A | CASE<=LASTSUBSYSTEM;<br>DCR@DAIA<-<br>STATE@ARRAY(VARIABLE@<br>POINTER); |
| 561 | 7080 | OTHERWISE CYCLE TRANSMIT |
| 562 | 7083 | END; |
| 563 | 7083 | IF DCR@DAIA!=0 THEN CALL<br>DISPLAY_INTERFACE (MESSAGE@<br>COMMAND,DCR@DATA); |
| 564 | 7094 | RELOOP; |
| 565 | 7098 | DCR@FLAG<- DCRPRESENT; |
| 566 | 70A3 | OTHERWISE BEGIN; |
| 567 | 70AB | IF DCR@FLAG=DCPRESENT THEN<br>CALL DISPLAY_INTERFACE<br>(USER@NUM,USER@DATA); |
| 568 | 70B4 | END; |
| 569 | 70B4 | END; |
| 570 | 70B4 | END; |
| 571 | 70B4 | END; |

APPENDIX C

| | | |
|---|---|---|
| 142 | 7D5C | ELSE BEGIN; |
| 143 | | CRASH@RECOVER@FLAG<-CRASHRECOVER; |
| 144 | 7D61 | IF ((IO@CONFIG & RDHCONFIGM ASK)<br>!= 0) & |
| 145 | | (JOB@SELECTION( INPUTSTATION) = RDH)<br>THEN |
| 146 | 7D71 | START INPUT_STATE_MANAGER<br>(RDHCRASHRESTORECOMMAND, 0); |
| 147 | 7D77 | END; |
| 804 | 87FF | IF (CRASH@RECOVER@FLAG = CRASHRECOVER)<br>THEN BEGIN; |
| 805 | | START STATE_HANDLER<br>(OPERATORINTERFACESTATE/GOREADY); |
| 806 | 880A | IF (STATE@ARRAY(VIPSTATE) = LEVEL 2) |
| 807 | 8812 | THEN INTERRUPTS<- ON; |
| 808 | 8819 | DEFAULT_JOB(CURRENTFEATURES); |
| 811 | 882E | IF (JOB@STATE = COMPLETE) THEN |
| 812 | 8835 | START PROCESS_KEYBOARD<br>(RESTOREQUANTITYSELECTED / 3); |
| 813 | 8838 | ELSE BEGIN; |
| 814 | | START PROCESS_KEYBOARD<br>(RESTOREQUANTITYSELECTED); |
| 815 | 883E | START QUTY_FLSHD<br>(UPDATEDISPLAY); |
| 816 | 8841 | END; |
| 817 | 8841 | IF ((IO@CONFIG & RDHCONFIGMASK)<br>!= 0) & |
| 818 | | (JOB@SELECTION(INPUTSELECTION) = RDH)<br>THEN |
| 819 | 8851 | START INPUT_STATE_MANAGER<br>(UPDATENUMBERORIGINALS,<br>NUMBER@ORIGINLS); |
| 820 | 885A | IF ((IO@CONFIG & SADHCONFIGMASK)<br>!= 0) & |
| 821 | | (CFF@RUN = 1) THEN |
| 822 | 886A | START INPUT_EXECUTIVE<br>(SELECTCFFMODE); |
| 823 | 886D | OUTPUT_INTERFACE<br>(UPDATESHEETSDELIVEREDMSB,<br>MSB(SHEETS@DELIVERE@OUTPUT)); |
| 824 | 8876 | OUTPUT_INTERFACE<br>(UPDATESHEETSDELIVEREDLSB,<br>LSB(SHEETS@DELIVERE@OUTPUT)); |
| 825 | 887E | OUTPUT_INTERFACE (UPDATEPRESENTBIN,<br>PRESENT@BIN); |
| 826 | 8886 | CRASH@RECOVER@FLAG<-0; |
| 827 | 888A | END; |

APPENDIX D

1176 GLOBAL PROCEDURE JUMP_ZERO

APPENDIX D-continued

```
1177  /************************************************     *
1178  *                                                       *
1179  *                                                       *
1180  *                                                       *
1181  * DESCRIPTION:   JUMP TO LOCATION ZERO OF CPM OR CRASH DISPLAY  *
1182  *                ROUTINE. WHEN OPERATING SYSTEM OR DIAGNOSTIC    *
1183  *                DETECTED ANY SYSTEM MALFUNCTION, THEY WILL WRITE *
1184  *                THE ERROR CODE TO NVM LOCATION 100 AND JUMP TO   *
1185  *                THIS ROUTINE.                                     *
1186  *                THIS ROUTINE WILL CHECK TO SEE IF EXIT FROM       *
1187  *                DIAGNOSTIC AND NVM LOCATION 100 IS ZERO. IF IT IS *
1188  *                NOT, AND THE CRASH LOCATION (LOCATION 102) IS     *
1189  *                ENABLE THEN THIS WILL JUMP TO CRASH DISPLAY       *
1190  *                ROUTINE IN CPM. OTHERWISE THIS WILL JUMP TO       *
1191  *                LOCATION ZERO IN CPM AND SET THE FLAG (FOR INCRE  *
1192  *                CRASH COUNTER IN SLC TEST) IF LOCATION 100 IS NOT *
1193  *                ZERO.                                             *
1194  *                                                                  *
1195  *                                                                  *
1196  *                                                                  *
1197  *                                                                  *
1198  *                                                                  *
1199  *                                                                  *
1200  *************************************************************/
1201
1202  DECLARE
1203       PROCEDURE DCH_INTERFACE(BYTE, BYTE),
1204       PROCEDURE INCREMENT_COUNTER(BYTE),
1205       DCR&RESET              EXTERNAL WO RAM BIT VARIABLE
1206         TYPE=OUTPUT          ZERO=RESET DCR   ONE=RELEASEDCR,
1207       DCRRETRY               GLOBAL RW RAM BYTE VARIABLE,
1208       DCRINDICATE            GLOBAL RW RAM BYTE VARIABLE,
1209       DCRFLAG                EXTERNAL RW RAM BYTE VARIABLE,
1210       LASTCRASHFINE          EXTERNAL RW RAM BYTE VARIABLE,
1211       LASTCRASHCOURSE        EXTERNAL RW RAM BYTE VARIABLE,
1212       JUMP7STAT              EXTERNAL RW RAM BYTE VARIABLE,
1213       JUMP7FIN               EXTERNAL RW RAM BYTE VARIABLE,
1214       JUMP7FLT               EXTERNAL RW RAM BYTE VARIABLE,
1215       CRASHENABLE            EXTERNAL RW RAM BYTE VARIABLE,
1216       DTAGEXIT               EXTERNAL RW RAM BYTE VARIABLE,
1217       BESTTIME               EXTERNAL RW RAM BYTE VARIABLE,
1218       RUNBIT                 EXTERNAL RW RAM BYTE VARIABLE,
1219       TOTALCRASHCNT          EXTERNAL RO NOMEM BYTE CONSTANT:
1220       /*SPAGE*/
1221  ENTER:
1222       DCRFLAG <- 01
1223       IF DIAGEXIT = 0 THEN
1224       BEGIN;                                           /*If this is a crash and
1225            JUMPZSTAT <- 1;                              machine in rum mode
1226            PESITIME <- 128;                             then increment total crash
1227            IF RUNBTT = 1 THEN INCREMENT_COUNTER(TOTALCRASHCNT):   counter in run mode*/
1228       END:
1229       DIAGEXIT,RUNBIT <- 0;
1230       LOOPHOLE:
              *
              *
           RAMPAGF      EQU    X'FC00'      DOWN LOAD ADDRESS
           ENABLE       EQU    X'4B'        INDICATE CRASH IS ENABLE
           DCRENA       EQU    X'4C'        ENABLE DCP CRASH
           BYTE         EQU    8            NUMBER OF BYTES DOWNLOADED
           PAGEBIT      EQU    X'00'
           LEDS         EQU    X'80'        LEAVE LEDS AND DCR RESET ON
           DCRCRASH     EQU    X'8F'        DCR CRASH LOG
           PGROMSEN     EQU    X'E30B'      OUTPUT PORT FOR TURN PAGE
           CRASHROUTINE EQU    X'7A'        CRASH ROUTINE ENTRY
              *
              *
            LDA          JUMP7FLT           CHECK CRASH LOCATION
            ANA          A
            J7           NOTCRASH           IF CRASH THEN
            CPI          DCRCRASH           IS IT A DCR CRASH
            JNZ          NOTDCR
            LDA          CRASHENABLE        AND IS DCR CRASH ENABLE
            CPI          DCRFNA
            JZ           CRASHROUT          THEN GOES TO CRASH ROUTINE
            JMP          ENDLOOP            ELSF GOES TO END OF LOOPHOLE
           NOTDCR        :LABEL                                              /* Crash display
            LDA          CRASHENABLE        CHECK FOR CRASH IS ENABLE  routine is enable
            SHI          ENABLE             by Tech Rep set-
            CPI          2                  ting NVM Roca-
            JNC          NOTCRASH           IF CRASH AND ENABLE THEN   tion 102 to
                                                                        75 or 76 */
```

APPENDIX D-continued

```
          CRASHROUT            :LABEL
          LXI            H,DOWNLOADNVM     TO CRASH DISPLAY ROUTINE
          JMP            CRASH
          NOTCRASH           :LABEL
          LXI            H,DOWNLOAD        POINT TO ROM TO BE DOWNLOADED
          CRASH              :LABEL
          LXI            B,RAMPAGE         POINT TO RAM
          MVI            D,BYTE            NUMBER OF BYTES
          LOOP2              :LABEL
          MOV            A,M
          STAX           B
          INX            H                 POINT TO NEXT BYTE
          INX            H
          DCR            D
          JNZ            LOOP2
          DT
          JMP            RAMPAGE
          DOWNLOAD           :LABEL
          MVI            A,PAGEBIT
          STA            PGROMSEN          TURN THE PAGE
          JMP            0                 JUMP TO CPM ENTRY
          DOWNLOADNVM        :LABEL
          MVI            A,LEDS
          STA            PGROSEN
          JMP            CRASHROUTINE      JUMP TO CRASH ROUTINE ENTRY
          ENDLOOP            :LABEL
1284      END:
1285      CANCEL DCP_INTERFACE:
1286      DCHINDICATE <- 0;
1287      DCRSSHESFT <- RESETDCH;
1288      WAIT 10 MS;
1289      DCRSRFSFT <- RELEASEDCR:
1290      DCRINDICATE <- 1;
1291      LASTCRASHFINE <- JUMPZFIN;
1292      LASTCRASHCOARSE <- JUMPZFLT;
1293      JUMPZFLT,JUMPZSTAT <- 0;
1294      END;
```

```
********************************************    *
* CRASH ROUTINE                                  *
* THIS PROCESS IS FOR DEFOG ATD FOR CRASH INVESTIGATE WHEN   *
* MACHINE GOES TO THE FIELD. THIS ROUTINE IS ENABLE BY SETTING *
* CRASHENABLE TO RVF TP 75, WHEN A CRASH OCCURS, JUMP TO ZERO  *
* ROUTINE KILL DOWN LOAD TURN PAGE CODE TO SPARE NVM AND JUMP  *
* TO THIS ROUTINE. THIS ROUTINE WILL ALLOW THE TECH REP TO     *
* EXAMPLE ALL NVM AND RAM WHEN CRASHING.THE FOLLOWING          *
* KEYBOARD WILL DO THESE FUNCTION:                             *
* CLEAR PUSH: WILL CLEAR CRASH LOG AND JUMP 0                  *
* STOP PUSH: WILL INCREMENT LOWER BYTE ADDRESS AND DISPLAY     *
* P AND STOP PUSH:%ILL DECREMENT LOWER BYTE AND DISPLAY        *
* O AND ANYTHING ABOVE:WILL SPEED UP DISPLAY ROUTINE           *
**********************************************
BASEOUTPUT EQU     X'E300'       BEGINNING OF OUTPUT PORT
BIGE EQU           X'79'         BIG CAPTIAL LATTER E
CLEARPUSH EQU      X'FD'         INDICATE CLEAR IS PUSH
CRASHLUG EQU       X'ED00'       CRASH LOCATION
CURRENTSTACK EQU   X'E1F0'       CURRENT STACK STORAGE
TOTALLOG EQU       X'EOFF'       INTIALIZE TO E000 WHEN STOP PU
INTERRUPTPUSH EQU  X'DF'         INIDICATE INTERRUPT BUTTON IS P
KBRIGHTO EQU       X'E309'       OUTPUT PORT FOR LED RIGHT 0
KBRIGHT3 EQU       X't30A'       OUTPUT PORT FOR 7 SEGMENT RIGHT
LEDPORT EQU        X'0B'         PORT CONTAIN LED
NVMBEGIN EQU       X'E000'       BEGINNING OF NVM
NVMLIMIT EQU       X'L2'         UPPER LIMIT OF NVM
NVMSTACK EQU       X'E200'       INITIALIZE SP TO E1FF
PSTOPPUSH EQU      X'AF'         INDICATE P AND STOP ARE PUSH
RAMBEGIN EQU       X'E000'       LOWER LIMIT OF RAM
RAMLIMIT EQU       X'00'         UPPER LIMIT OF RAM
SCCADDRESS EQU     X'E3'         HIGH ODER ADDRESS OF SCC
SCCSTORAGE EQU     X'E1EF'       NVM LOCATION FOR STORING SCC
SMALLO EQU         X'SC'         SMALL LETTER O
SMALLR EQU         X'SO'         SMALL LETTER R
STOPPUSH EQU       X'BF'         INDICATE STOP IS PUSH
ZEROPUSH EQU       X'DB'         INDICATE ZERO IS PUSH
CRASHROUTINE EQU   S             BEGINNING OF CRASH ROUTINE
A         RVI      A,SOOCLR      CLEAR SOD LINE TP RESET ALL
A         SIP                    REMOTE AND IOP
A         LXI      H,UASEOUTPUT
          REPFAT
                                 CLEAR ALL CPM OUTPUT
```

What is claimed is:

1. In a control for controlling the operation of a printing machine, the printing machine including a plurality of operating components for producing images on a copy sheet, the control including a master processor with memory and message receive circuitry, a shared communication channel, and a plurality of remote processors connected to a master processor through the shared communication channel, the master processor adapted for transmitting a verification message to itself over the message receive circuitry, the method of the master processor identifying a fault occurring in one of the remote processors manifested by a fault message comprising the steps of:

one of the remote processors recognizing said fault and generating said fault message, said one of the remote processors conveying the fault message to the master processor, the master processor recording the fault message in said memory, the master processor transmitting said verification message to itself over said message receive circuitry for verifying the integrity of the message receive circuitry, and the master processor identifing the source of the fault to be said one of the remote processors.

2. The method of claim 1 wherein the control includes a running clock pulse count and the step of recording the fault message includes the step of time stamping and fault message in the master processor memory with the current clock pulse count in order to determine the source of the first fault in a succession of faults.

3. In a reproduction machine control for controlling the operation of a plurality of reproduction machine operating components including a photoreceptor, said operating components cooperating with one another to produce impressions on copy sheets, the machine control comprising a master processor and a plurality of remote processors, each of the remote processors adapted for generating fault messages, each of the processors having transmit and receive means, the master processor having a memory for recording a machine fault, each of the processors being interconnected via a common communication channel, the method of identifying faults in the control comprising the steps of (1) one of the remote processors recognizing the machine fault, (2) said one of the remote processors conveying a fault message in response to recognizing the machine fault to the master processor via said communication channel, (3) said master processor recording the fault message in said memory identifying said one of the remote processors, (4) said master processor transmitting a message to itself over its transmit and receive means, and (5) said master processor determining the integrity of its receive means whereby the master processor identifies the machine fault to be related to said one of the remote processors.

* * * * *